US009297680B2

(12) United States Patent
Maruyama et al.

(10) Patent No.: US 9,297,680 B2
(45) Date of Patent: Mar. 29, 2016

(54) ULTRASONIC FLOW METER HAVING DETERIORATION SUPPRESSION IN FLOW RATE ACCURACY

(71) Applicant: SMC Corporation, Chiyoda-ku (JP)

(72) Inventors: Tetsuro Maruyama, Tsukubamirai (JP); Takamitsu Suzuki, Joso (JP)

(73) Assignee: SMC CORPORATION, Chiyoda-ku (JP)

( * ) Notice: Subject to any disclaimer, the term of this patent is extended or adjusted under 35 U.S.C. 154(b) by 83 days.

(21) Appl. No.: 14/265,527

(22) Filed: Apr. 30, 2014

(65) Prior Publication Data

US 2015/0082913 A1    Mar. 26, 2015

(30) Foreign Application Priority Data

Sep. 24, 2013   (JP) .................................. 2013-197266

(51) Int. Cl.
*G01F 1/66*    (2006.01)
(52) U.S. Cl.
CPC ........................................ *G01F 1/66* (2013.01)
(58) Field of Classification Search
None
See application file for complete search history.

(56) References Cited

U.S. PATENT DOCUMENTS

| | | | |
|---|---|---|---|
| 4,140,012 A | | 2/1979 | Hendriks |
| 4,739,652 A | * | 4/1988 | Kovari ..................... E02D 1/022 73/152.54 |
| 5,383,369 A | | 1/1995 | Khuri-Yakub et al. |
| 5,458,004 A | | 10/1995 | Van Der Pol |
| 5,717,145 A | | 2/1998 | Yasuhara et al. |
| 5,728,947 A | * | 3/1998 | Marsh ..................... G01F 1/3281 73/861.23 |
| 5,905,207 A | | 5/1999 | Schalk |
| 5,922,975 A | * | 7/1999 | Butler ..................... E21B 49/084 73/864.74 |
| 2002/0139198 A1 | | 10/2002 | Ohnishi |
| 2009/0044636 A1 | * | 2/2009 | Hope ....................... G01F 1/40 73/861.28 |
| 2013/0112302 A1 | | 5/2013 | Fukano et al. |

FOREIGN PATENT DOCUMENTS

| | | |
|---|---|---|
| CN | 201795821 U | 4/2011 |
| EP | 1 887 328 A1 | 2/2008 |
| JP | 61-264214 A | 11/1986 |

(Continued)

OTHER PUBLICATIONS

Office Action issued Aug. 12, 2014 in Japanese Patent Application No. 2013-197266 (with English translation of pertinent portions).

(Continued)

*Primary Examiner* — Harshad R Patel
(74) *Attorney, Agent, or Firm* — Oblon, McClelland, Maier & Neustadt, L.L.P (57) ABSTRACT

An ultrasonic flow meter is equipped with a housing through which a liquid flows, and a pair of detection units disposed on opposite ends of the housing and including acoustic wave transmitting and receiving units capable of transmitting and receiving acoustic wave signals. Paired connecting plugs are connected respectively to both ends of the housing. In addition, a supply passage of one of the connecting plugs, a conduit of the housing, and a discharge passage of another of the connecting plugs are disposed on a straight line. A liquid supplied to the supply passage flows through a passage of the conduit and to the discharge passage. Consequently, a flow rate of the liquid is measured based on the propagation time of the acoustic wave signals, which are transmitted and received by the acoustic wave transmitting and receiving units.

8 Claims, 6 Drawing Sheets

(56) References Cited

FOREIGN PATENT DOCUMENTS

| JP | 04-370714 A | 12/1992 |
| JP | 5-215759 A | 8/1993 |
| JP | 10-030946 A | 2/1998 |
| JP | 2793133 | 9/1998 |
| JP | 10-274551 A | 10/1998 |
| JP | 2000-146644 A | 5/2000 |
| JP | 3246851 | 1/2002 |
| JP | 2002-365106 | 12/2002 |
| JP | 2003-156376 A | 5/2003 |
| JP | 2013-096553 A | 5/2013 |

OTHER PUBLICATIONS

Combined Taiwanese Office Action and Search Report issued Feb. 13, 2015 in Patent Application No. 103116205 (with English language translation).

Office Action issued Mar. 10, 2015 in Japanese Patent Application No. 2013-197266 (with partial English language translation).

* cited by examiner

ULTRASONIC FLOW METER HAVING DETERIORATION SUPPRESSION IN FLOW RATE ACCURACY

CROSS-REFERENCE TO RELATED APPLICATION

This application is based upon and claims the benefit of priority from Japanese Patent Application No. 2013-197266 filed on Sep. 24, 2013, the contents of which are incorporated herein by reference.

BACKGROUND OF THE INVENTION

1. Field of the Invention

The present invention relates to an ultrasonic flow meter for detecting the flow rate of a liquid based on a propagation velocity difference exhibited when acoustic waves are propagated through the liquid.

2. Description of the Related Art

Heretofore, an ultrasonic flow meter has been known in which, for example, paired transducers are arranged respectively on an upstream side and a downstream side of a conduit through which a liquid flows. Ultrasonic waves transmitted from one of the transducers are reflected by an inner wall surface of the conduit and are received by another of the transducers, and a flow velocity or a flow rate of the liquid is measured based on a difference in propagation velocities of the ultrasonic waves.

In such an ultrasonic flow meter, for example as disclosed in Japanese Patent No. 2793133 (Patent Document 1), a measurement conduit is provided having a supply pipe to which the liquid is supplied and a discharge pipe from which the liquid is discharged. Further, a first measurement head is disposed on one end of the measurement conduit, and a second measurement head is disposed on another end of the measurement conduit. The first and second measurement heads are constituted to function as acoustic wave emitters or acoustic wave receivers. For example, a pulse shaped acoustic wave signal is transmitted from the first measurement head, and the second measurement head receives the acoustic wave signal as an acoustic wave receiver. Next, the first measurement head is switched to operate as a receiver, and by reception thereon of an acoustic wave signal transmitted from the second measurement head, the flow rate of the liquid is measured based on a difference in the propagation velocities of the acoustic wave signals.

However, with the ultrasonic flow meter according to Patent Document 1, a structure is provided in which the liquid supplied to the supply pipe is changed in direction substantially perpendicularly, whereupon the liquid then flows to the measurement conduit. Therefore, by the sudden change in the flow direction of the liquid, a pressure change occurs resulting in turbulence, so that air entrained in the liquid forms gas bubbles in the liquid, whereby such gas bubbles adhere to the inner wall surface of the measurement conduit, which is disposed in confronting relation to the first and second measurement heads. Due to adhesion of such gas bubbles, the gas bubbles interfere with propagation of the acoustic wave signals, leading to deterioration in the accuracy with which the flow rate of the liquid is measured.

Further, with the ultrasonic flow meter disclosed in Japanese Patent No. 3246851 (Patent Document 2), transducers are arranged respectively on opposite ends of an inflow conduit, together with a supply pipe and a discharge pipe, each of which is inclined at a predetermined angle with respect to the axis of the inflow conduit, being connected to both ends thereof. The supply pipe and the discharge pipe are disposed along a straight line and are connected to the inflow conduit through curved pipes, which are bent respectively.

With such a structure, compared to the case of the ultrasonic flow meter according to Patent Document 1, a change in pressure, which occurs when the liquid flows into the inflow conduit from the supply pipe, or when the liquid flows into the discharge pipe from the inflow conduit, is decreased, and the occurrence of gas bubbles is suppressed to a certain extent. However, in this type of ultrasonic flow meter, since the connections of the supply pipe and the discharge pipe with respect to the inflow conduit are not straight, but rather are of a step-like shape, more than a minimal amount of pressure loss occurs, and generation of gas bubbles cannot be entirely avoided.

Furthermore, with the ultrasonic flow meter disclosed in Japanese Laid-Open Patent Publication No. 2002-365106 (Patent Document 3), a pair of ultrasonic transceivers is disposed in facing relation to an outer surface of a tubular body, the ultrasonic transceivers being arranged at an acute angle with respect to the axis of the tubular body. With the ultrasonic flow meter having the aforementioned structure, since the tubular body through which the liquid flows is formed along a straight line, upon flow of the liquid through the tubular body, a change in pressure does not occur, and thus generation of gas bubbles or pooling of liquid is suppressed.

SUMMARY OF THE INVENTION

With the ultrasonic flow meter of the aforementioned Patent Document 3, a structure is proposed in which generation of gas bubbles accompanying a change in pressure is suppressed, and acoustic wave signals originating from one of the ultrasonic transceivers are received by the other of the ultrasonic transceivers after propagation thereof through the liquid while being reflected and bent by the inner wall surface of the tubular body. Consequently, it is difficult for the flow rate of the liquid to be measured accurately by propagation of the acoustic wave signals. Along therewith, flow rate accuracy is lowered, together with measurements at low flow rates being difficult to make.

Further, with the ultrasonic flow meters according to Patent Document 1, Patent Document 2, and Patent Document 3, since the supply pipe and the discharge pipe project radially outwardly with respect to the main measurement conduit, a large space is needed when the ultrasonic flow meters are installed, and the layout and handling of tubes connected to the supply pipe and the discharge pipe is complex.

A general object of the present invention is to provide an ultrasonic flow meter, which can suppress deterioration in flow rate accuracy of a liquid by suppressing generation of gas bubbles, while minimizing space requirements in an installation environment for the ultrasonic flow meter.

According to the present invention, an ultrasonic flow meter for measuring a flow rate of a liquid based on acoustic wave signals is provided, comprising a casing having therein a passage through which the liquid flows, a pair of detection units capable of transmitting and receiving acoustic wave signals and arranged in confronting relation to each other in the interior of the casing while sandwiching the passage therebetween, and a pair of port members connected respectively to opposite ends of the casing and through which the liquid is supplied and discharged.

In the ultrasonic flow meter, the casing, the port members, and the detection units are disposed on a straight line, and in the interior of the casing, the liquid supplied from one of the port members flows through a communication path formed on an outer circumferential side of the detection units and into the passage, and then flows through the passage to another of the port members.

According to the present invention, in the ultrasonic flow meter in which the pair of detection units is disposed in the interior of the casing, the detection units are accommodated respectively while sandwiching therebetween the passage that is formed in the interior of the casing, and the two port members are connected to both ends of the casing. In addition, owing to the fact that the liquid, which is supplied from one of the port members, flows through the communication path formed on an outer circumferential side of the detection unit inside the linearly disposed casing, and thereafter flows to the other one of the port members, variations in pressure are inhibited to a minimum, and generation of gas bubbles due to such variations in pressure can be suppressed.

As a result, lowering in detection accuracy by adherence of gas bubbles generated in the liquid on the detection units can be prevented, and the flow rate of the liquid can be measured with high accuracy by the detection units.

Further, by arranging the pair of port members and the casing on a straight line, there is no increase in size in the radial direction of the ultrasonic flow meter, and thus the space of the installation environment for the ultrasonic flow meter can be minimized. In addition, since tubes can be also connected to the port members on a straight line, handling of such tubes is facilitated.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
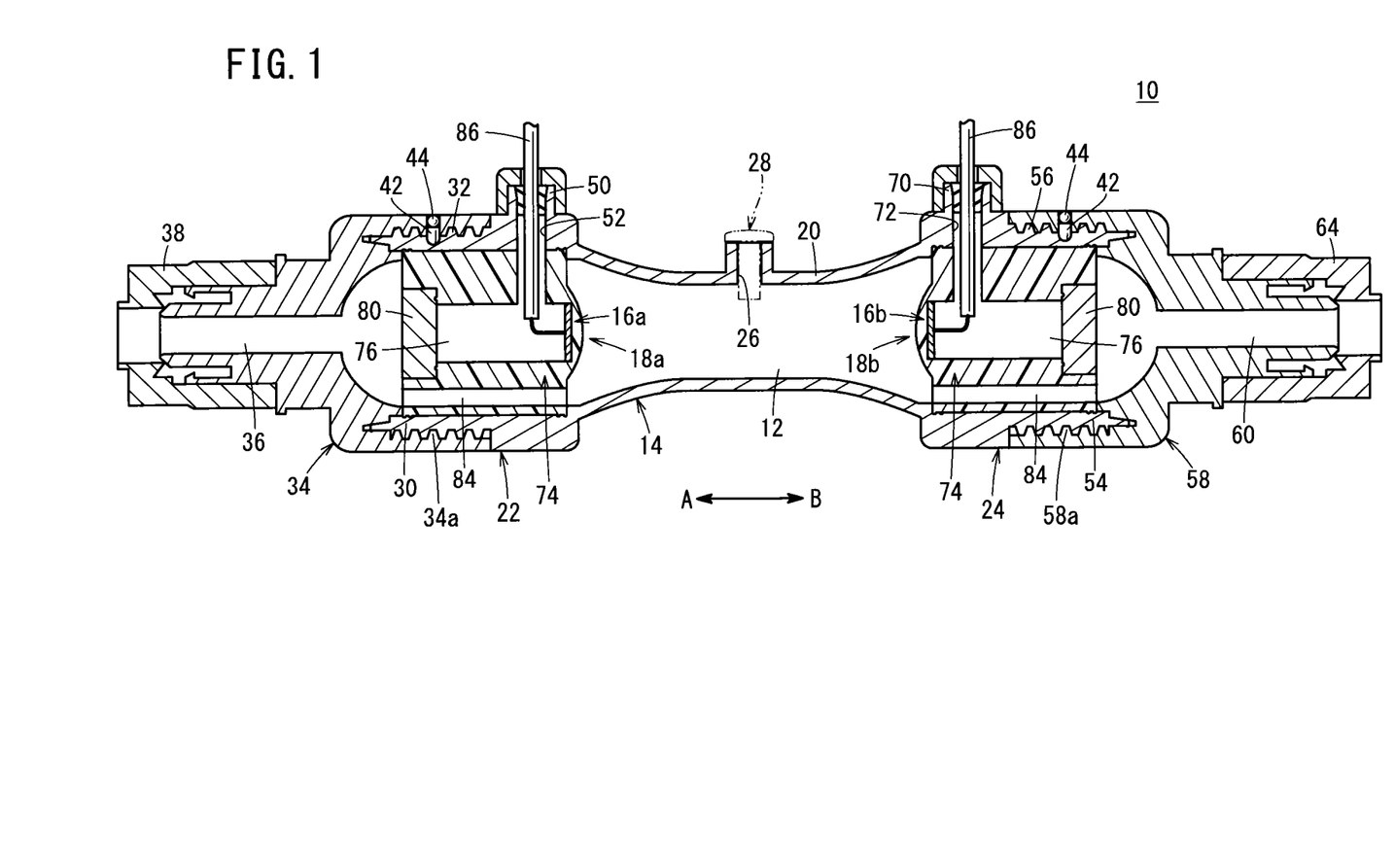
FIG. 1 is an overall cross sectional view of an ultrasonic flow meter according to a first embodiment of the present invention.

As shown in FIG. 1, an ultrasonic flow meter 10 includes a housing (casing) 14 having a passage 12 therein to which a fluid, for example, water, or a chemical solution or the like, is supplied, a pair of detection units 18a, 18b disposed on opposite ends of the housing 14 and in which acoustic wave transmitting and receiving units 16a, 16b capable of transmitting and receiving acoustic wave signals are accommodated.

The housing 14 includes a conduit 20, which is formed in a straight line, for example, from a metallic material such as stainless steel or the like, a first accommodating section 22 formed on one end of the conduit 20, and a second accommodating section 24 formed on another end of the conduit 20.

The conduit 20 has a predetermined length along the axial direction (the direction of arrows A and B), with a smallest diameter formed in a central portion thereof, and the conduit 20 is formed to expand gradually in diameter, from the central portion, respectively, toward the one end side and the other end side. Further, substantially in the center of the conduit 20, an installation port 26 is formed, which projects in a radial outward direction from the outer circumferential surface substantially perpendicularly to the axis of the conduit 20. In the installation port 26, a given type of measurement sensor (sensor) 28, for example, a pressure sensor for measuring a pressure of a liquid that flows through the interior of the housing 14, or a temperature sensor for measuring a temperature of the liquid, can be mounted selectively. The measurement sensor 28 is inserted with respect to the installation port 26 from the exterior of the housing 14, such that a sensing element thereof is disposed to project into the interior of the passage 12 (refer to the shape of the two-dot dashed line shown in FIG. 1).

The housing 14 is not limited to the case of being made from a metallic material, and may be formed from a resin material.

Figure 2A:
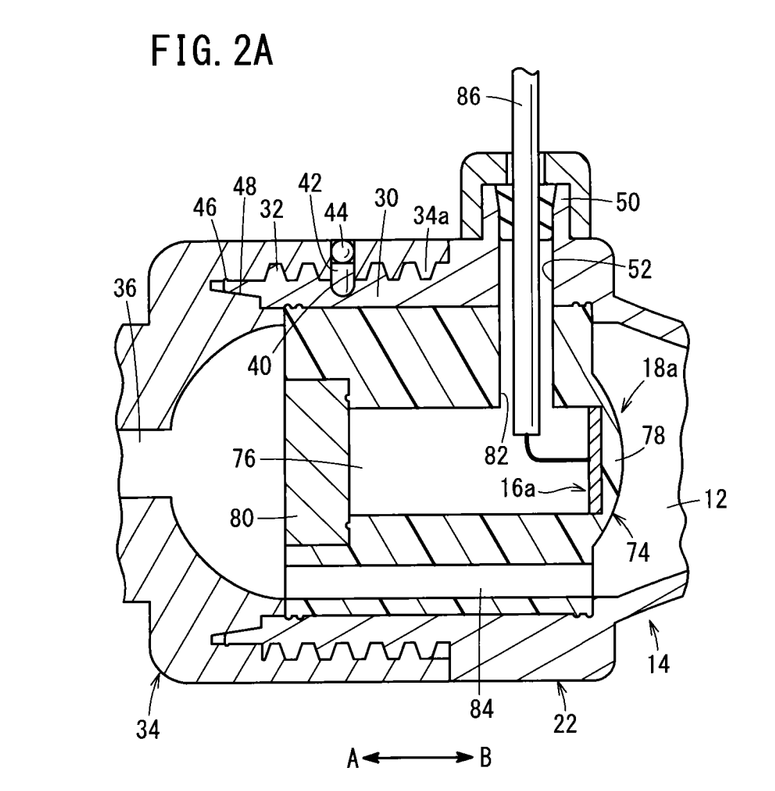
FIG. 2A is an enlarged cross sectional view showing the vicinity of one detection unit in the ultrasonic flow meter of FIG. 1.

As shown in FIGS. 1 and 2A, the first accommodating section 22, for example, is formed in a cylindrical shape with a substantially constant diameter, which is expanded in diameter with respect to the conduit 20. One of the detection units 18a is accommodated in the interior of the first accommodating section 22. Further, in the first accommodating section 22, a first connecting member 30 is formed, which extends in a direction away from the conduit 20 (in the direction of the arrow A), with a first threaded portion (threaded portion) 32 being formed on the outer circumferential surface thereof.

The first threaded portion 32, for example, is constituted from trapezoidal screw threads, which are shaped as trapezoids in cross section. A connecting plug (port member) 34 is connected through the first threaded portion 32 on the outer circumferential side of the first connecting member 30.

The connecting plug 34 is formed in a cylindrical shape, which is opened on one end thereof, and a threaded portion 34a formed on the inner circumferential surface of the connecting plug 34 is screw-engaged with the first threaded portion 32 of the first connecting member 30. As a result, the connecting plug 34 is mounted in covering relation to the outer circumferential surface of the first connecting member 30. Liquid is supplied to the side of the housing 14 through a supply passage (port) 36 formed in a substantially central portion of the other end side (in the direction of the arrow A) of the connecting plug 34.

The supply passage 36 communicates with the first accommodating section 22 of the housing 14, and is formed on a straight line together with the conduit 20. On the other end of the connecting plug 34, a non-illustrated tube is connected thereto through a coupling member 38, which is mounted on an outer circumferential surface of the connecting plug 34. The tube is connected to a non-illustrated liquid supply source.

Further, a penetrating through hole 40 is formed in the connecting plug 34, which penetrates in a radial inward direction from the outer circumferential surface thereof. An engagement pin 42 is inserted in the through hole 40 along the axial direction of the through hole 40. More specifically, the engagement pin 42 is inserted in a direction perpendicular to the axis of the housing 14 and the connecting plug 34.

The distal end of the engagement pin 42 is inserted up to the outer circumferential surface of the first connecting member 30. As a result, relative rotational displacement, i.e., slackness or loosening, of the connecting plug 34 that is connected to the first connecting member 30 is prevented. After the engagement pin 42 has been inserted in the through hole 40, a sealing ball 44 is press-fitted into the opening of the through hole 40, whereby the engagement pin 42 is retained in place and falling out thereof is prevented.

Stated otherwise, the engagement pin 42 functions as a loosening prevention mechanism, so as to prevent loosening of the connecting plug 34 with respect to the first connecting member 30 of the housing 14.

Figure 3:
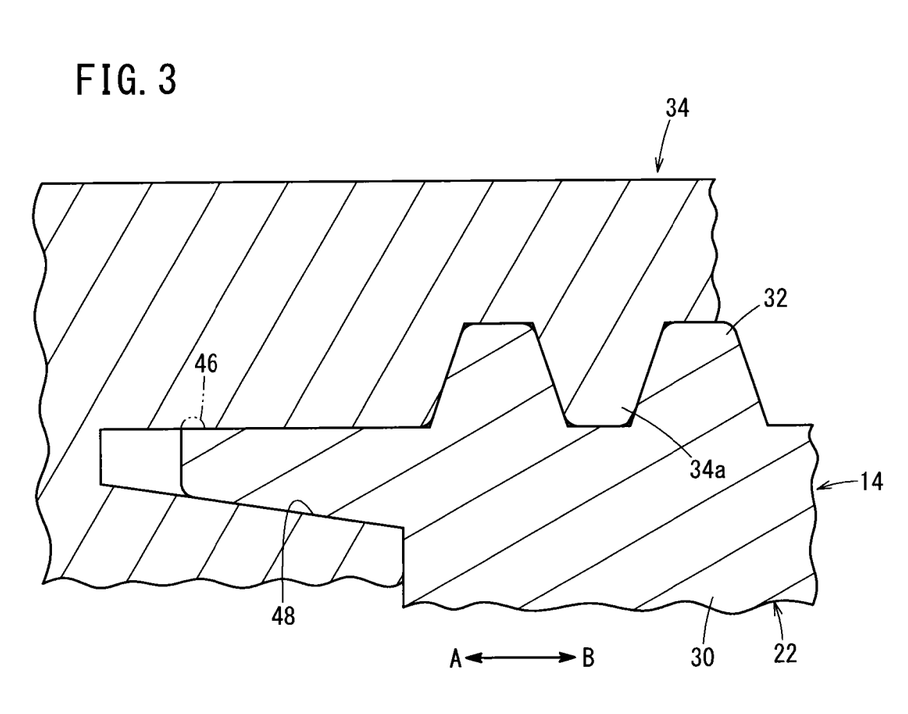
FIG. 3 is an enlarged cross sectional view showing the vicinity of a connected region between a first connection portion and a connecting plug in FIG. 2A.

Furthermore, as shown in FIGS. 2A and 3, an annular projection 46, which bulges with a semicircular cross-sectional shape, is disposed on the outer circumferential surface on the distal end of the first connecting member 30. In addition, when the connecting plug 34 is connected to the first connecting member 30, the distal end of the first connecting member 30 is press-fitted into a press-fitting groove (groove) 48 formed in the interior of the connecting plug 34, whereupon the projection 46 is brought into slide contact with the inner circumferential surface of the press-fitting groove 48 and then crushed against the inner circumferential surface, whereas the distal end of the first connecting member 30 is press-fitted and hence is pressed and crushed inside the press-fitting groove 48.

Owing thereto, the first connecting member 30 and the connecting plug 34 can be connected together more reliably and firmly. In addition, a seal is formed between the first connecting member 30 and the connecting plug 34, whereby leakage of liquid from the connected region between the first accommodating section 22 and the connecting plug 34 is prevented.

Further, on the outer circumferential surface of the first accommodating section 22, a lead-out part 50 is formed, which projects in a radial outward direction. A cable 86 of a later-described acoustic wave transmitting and receiving unit 16a is led out to the exterior from the interior of the housing 14 through a hole 52 formed in the center of the lead-out part 50. The lead-out part 50 is formed at a position in the vicinity of the conduit 20 on the outer circumferential surface of the first accommodating section 22.

Figure 2B:
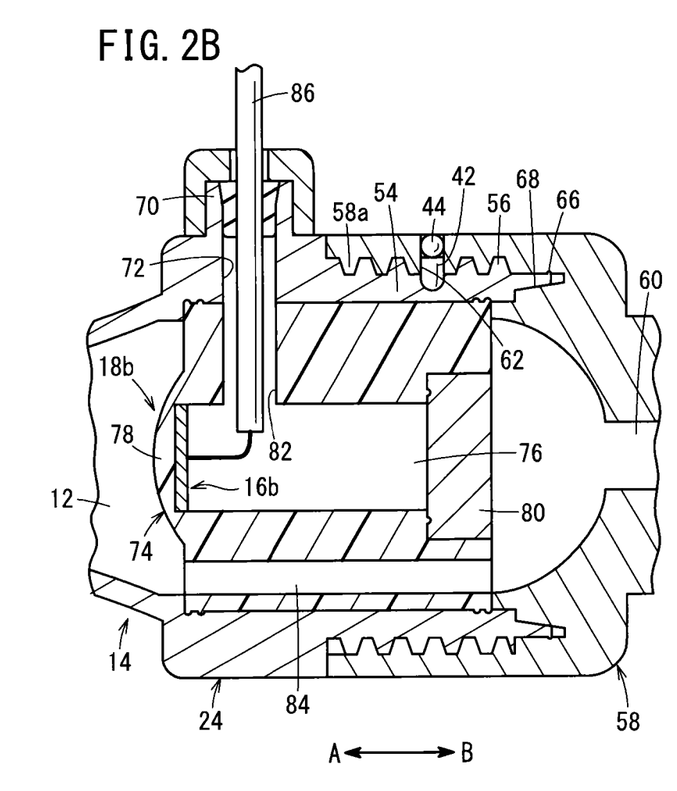
FIG. 2B is an enlarged cross sectional view showing the vicinity of another detection unit in the ultrasonic flow meter of FIG. 1.

As shown in FIGS. 1 and 2B, the second accommodating section 24 is formed in a cylindrical shape substantially in the same shape as the first accommodating section 22, and has a substantially constant diameter, which is expanded in diameter with respect to the conduit 20. The other one of the detection units 18b is accommodated in the interior of the second accommodating section 24. Further, in the second accommodating section 24, a second connecting member 54 is formed, which extends in a direction away from the conduit 20 (in the direction of the arrow B), with a second threaded portion (threaded portion) 56 being formed on the outer circumferential surface thereof. The second threaded portion 56, for example, is constituted from trapezoidal screw threads, which are shaped as trapezoids in cross section. A connecting plug (port member) 58 is connected through the second threaded portion 56 on the outer circumferential side of the second connecting member 54.

The connecting plug 58 is formed in a cylindrical shape, which is opened on one end thereof, and a threaded portion 58a formed on the inner circumferential surface of the connecting plug 58 is screw-engaged with the second threaded portion 56 of the second connecting member 54. As a result, the connecting plug 58 is mounted in covering relation to the outer circumferential surface of the second connecting member 54. On the other hand, liquid is discharged to the exterior through a discharge passage (port) 60 formed in a substantially central portion of the other end side (in the direction of the arrow B) of the connecting plug 58. The discharge passage 60 communicates with the second accommodating section 24 of the housing 14, and is formed on a straight line together with the conduit 20.

Further, a penetrating through hole 62 is formed in the connecting plug 58, which penetrates in a radial inward direction from the outer circumferential surface thereof. An engagement pin 42 is inserted in the through hole 62 along the axial direction of the through hole 62. More specifically, the engagement pin 42 is inserted in a direction perpendicular to the axis of the housing 14 and the connecting plug 58. A non-illustrated tube is connected to the other end of the connecting plug 58 through a coupling member 64, which is mounted on an outer circumferential surface of the connecting plug 58.

The distal end of the engagement pin 42 is inserted up to the outer circumferential surface of the second connecting member 54. As a result, relative rotational displacement, i.e., slackness or loosening, of the connecting plug 58 that is connected to the second connecting member 54 is prevented. After the engagement pin 42 has been inserted in the through hole 62, a sealing ball 44 is press-fitted into the opening of the through hole 62, whereby the engagement pin 42 is retained in place and falling out thereof is prevented.

Stated otherwise, the engagement pin 42 functions as a loosening prevention mechanism, so as to prevent loosening of the connecting plug 58 with respect to the second connecting member 54 of the housing 14.

Furthermore, as shown in FIG. 2B, an annular projection 66, which bulges with a semicircular cross-sectional shape, is disposed on the outer circumferential surface on the distal end of the second connecting member 54. In addition, when the connecting plug 58 is connected to the second connecting member 54, the distal end of the second connecting member 54 is press-fitted into a press-fitting groove (groove) 68 formed in the interior of the connecting plug 58, whereupon the projection 66 is brought into slide contact with the inner circumferential surface of the press-fitting groove 68 and then crushed against the inner circumferential surface, whereas the distal end of the second connecting member 54 is press-fitted and hence is pressed and crushed inside the press-fitting groove 68. Owing thereto, the second connecting member 54 and the connecting plug 58 can be connected together more reliably and firmly. In addition, a seal is formed between the second connecting member 54 and the connecting plug 58, whereby leakage of liquid from the connected region between the second accommodating section 24 and the connecting plug 58 is prevented.

Further, on the outer circumferential surface of the second accommodating section 24, a lead-out part 70 is formed, which projects in a radial outward direction. A cable 86 of a later-described acoustic wave transmitting and receiving unit 16b is led out to the exterior from the interior of the housing 14 through a hole 72 formed in the center of the lead-out part 70. The lead-out part 70 is formed at a position in the vicinity of the conduit 20 on the outer circumferential surface of the second accommodating section 24.

As shown in FIGS. 1 through 4, the detection units 18a, 18b include holders 74, which are accommodated respectively in the first and second accommodating sections 22, 24 of the housing 14, and are mounted in facing relation to the passage 12 of the housing 14, and acoustic wave transmitting and receiving units 16a, 16b, which are disposed in the interiors of the holders 74.

The holders 74 are formed, for example, from a resin material and are substantially U-shaped in cross section, with receiving holes 76 extending along the axial direction (the direction of arrows A and B) in center portions thereof. Ends of the holders 74, which are opened, are provided on sides of the connecting plugs 34, 58, whereas the other ends thereof, which are formed in a bottomed shape, are provided on the side of the passage 12 and are disposed in facing relation to the passage 12. For the holders 74, there may be used, for example, a fluorine resin as the resin material thereof. As shown in FIGS. 2A and 2B, on the other ends of the holders 74, curved portions 78 are provided, which bulge outwardly in the shape of a spherical surface toward the passage 12. The curved portions 78 are formed with a predetermined radius facing toward the passage 12, and the centers thereof, through which the axis of the passage 12 passes, bulge maximally outward. On opposite sides of the curved portions 78, ends of the receiving holes 76 are arranged, with the acoustic wave transmitting and receiving units 16a, 16b being mounted therein, respectively.

Further, in an opening of the receiving hole 76 on one end of each of the holders 74, a cap 80 is installed in a state with the acoustic wave transmitting and receiving unit 16a, 16b being accommodated internally therein, such that the receiving hole 76 is sealed by the cap 80, which is circular in cross section. Consequently, the interiors of the receiving holes 76 are hermetically sealed.

Furthermore, in the vicinity of the other ends of the holders 74, cable holes 82 are formed which connect the receiving holes 76 with the exterior. The cable holes 82 are arranged on a straight line and in communication with the holes 52, 72 of the housing 14.

Figure 4:
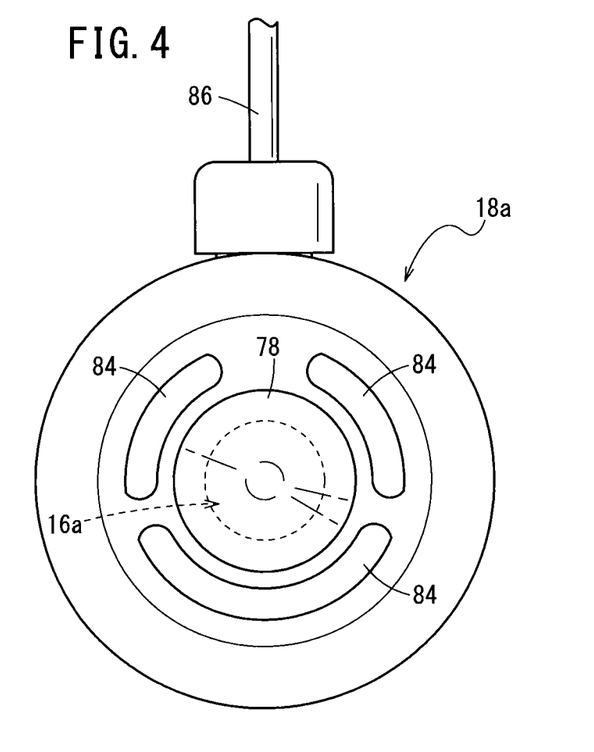
FIG. 4 is a front view in which one detection unit is seen from the side of a conduit of a housing illustrated in FIG. 1.

Further, on outer circumferential parts of the holders 74, plural (e.g., three) communication holes (communication paths) 84 are formed that penetrate in the axial direction (the direction of arrows A and B). The passage 12 of the housing 14, the supply passage 36 of the connecting plug 34, and the discharge passage 60 of the connecting plug 58 communicate with each other through the communication holes 84. As shown in FIG. 4, the communication holes 84, for example, have oblong shapes in cross section, and are formed at equal intervals mutually around the circumferential direction of the holders 74.

The acoustic wave transmitting and receiving units 16a, 16b are constituted from piezoelectric elements (piezo elements), which are formed, for example, in plate-like shapes, and are mounted respectively in the receiving holes 76 of the holders 74, which are formed with flat planar shapes. Together therewith, the acoustic wave transmitting and receiving units 16a, 16b are disposed substantially perpendicular to the conduit 20 of the housing 14. More specifically, the acoustic wave transmitting and receiving units 16a, 16b are arranged roughly perpendicularly with respect to the flow direction (the direction of arrows A and B) of the liquid that flows through the passage 12 of the housing 14. Cables 86 are connected as a pair, respectively, to the acoustic wave transmitting and receiving units 16a, 16b. The cables 86 are led out to the exterior through cable holes 82 of the holders 74 and the holes 52, 72 of the housing 14. In addition, the acoustic wave transmitting and receiving units 16a, 16b are connected electrically through the cables 86 to a non-illustrated controller.

The ultrasonic flow meter 10 according to the first embodiment of the present invention is constructed basically as described above. Next, operations and effects of the ultrasonic flow meter 10 will be described. A liquid is supplied to the supply passage 36 through the tube from a non-illustrated liquid supply source. The liquid flows in the supply passage 36, through the communication holes 84 of one of the detection units 18a, and then flows into the passage 12. Thereafter, the liquid flows through the communication holes 84 of the other of the detection units 18b and flows into the discharge passage 60.

In the ultrasonic flow meter 10, in a state in which liquid flows inside the passage 12 of the housing 14, acoustic wave signals are transmitted, for example, from the acoustic wave transmitting and receiving unit 16a of the detection unit 18a connected to one end of the housing 14, and the acoustic wave signals propagate inside the liquid while being reflected by the inner wall surface of the passage 12, and are received by the acoustic wave transmitting and receiving unit 16b of the detection unit 18b connected to the other end of the housing 14. In this case, the acoustic wave signals propagate along the flow direction of the liquid (the direction of the arrow B in FIG. 1).

Further, in a reverse manner, acoustic wave signals are transmitted from the acoustic wave transmitting and receiving unit 16b of the detection unit 18b connected to the other end of the housing 14, and the acoustic wave signals are received by the acoustic wave transmitting and receiving unit 16a of the detection unit 18a connected to the one end of the housing 14. In this case, the acoustic wave signals propagate along a direction opposite to the flow direction of the liquid (the direction of the arrow A in FIG. 1).

In addition, reception signals based on the acoustic wave signals, which are received by the acoustic wave transmitting and receiving units 16a, 16b, are output to the non-illustrated controller through the cables 86. A propagation time difference $\Delta T$ is calculated from the detection signals by the controller, not shown, based on a propagation time T1 for the case in which the acoustic wave signals were propagated in the flow direction of the liquid (in the direction of the arrow B), and a propagation time T2 for the case in which the acoustic wave signals were propagated in the direction opposite to the flow direction of the liquid (in the direction of the arrow A). A velocity V, i.e., a flow rate, of the liquid is calculated from the propagation time difference $\Delta T$.

In the foregoing manner, with the first embodiment, in the ultrasonic flow meter 10 in which the pair of detection units 18a, 18b is accommodated in the interior of the housing 14, the connecting plugs 34, 58 are connected respectively to opposite ends of the housing 14, and a liquid, which is supplied through the supply passage 36 of one of the connecting plugs 34, flows through the passage 12 of the housing 14, and is discharged to the exterior from the discharge passage 60 of the other connecting plug 58. Since the connecting plugs 34, 58 are connected along a straight line with respect to the passage 12 of the housing 14, when the liquid flows into the passage 12 from the supply passage 36, as well as when the liquid flows into the discharge passage 60 from the passage 12, pressure variations in the liquid are inhibited to a minimum, and thus generation of gas bubbles caused by such pressure variations can be suppressed.

As a result, adherence of gas bubbles generated in the liquid on the holders 74 of the detection units 18a, 18b can be suppressed, lowering in detection accuracy caused by adherence of such gas bubbles can be prevented, and the flow rate of the liquid can be measured with high accuracy by the detection units 18a, 18b.

Further, since the pair of connecting plugs 34, 58 is arranged along a straight line on opposite ends of the housing 14, compared with the ultrasonic flow meters of the conventional art, there is no increase in size on the outer circumferential side of the housing 14, and thus the space of the installation environment for the ultrasonic flow meter can be minimized. In addition, since the tubes can be connected with respect to the connecting plugs 34, 58 along a straight line, the layout and handling of such tubes is facilitated.

Furthermore, in the first and second accommodating sections 22, 24 of the housing 14, the first and second threaded portions 32, 56 in the form of trapezoidal screw threads are provided on outer circumferential surfaces of the first and second connecting members 30, 54, whereby the threaded portions 34*a*, 58*a* of the connecting plugs 34, 58 are screw-engaged, from outer circumferential sides, respectively, with the first and second threaded portions 32, 56. Consequently, compared to using threaded portions that are triangular in cross section, as is conventional in the art, since the connecting plugs 34, 58 can be fastened to the housing 14 with a strong fastening force, loosening of the connecting plugs 34, 58 is inhibited, and firm fastening thereof, which is not susceptible to loosening, can be realized in the ultrasonic flow meter 10.

Further still, in a state in which the connecting plugs 34, 58 are screw-engaged respectively with the first and second accommodating sections 22, 24 in the housing 14, the engagement pins 42 are inserted in the through holes 40, 62 of the connecting plugs 34, 58 toward the inner circumferential side, and the distal ends thereof are placed in engagement, respectively, with the outer circumferential sides of the first and second connecting members 30, 54. Owing thereto, loosening of the connecting plugs 34, 58 from the first and second accommodating sections 22, 24 can reliably be prevented.

As a result, even in the case that vibrations, for example, are applied to the ultrasonic flow meter 10, loosening of the connecting plugs 34, 58 from the housing 14 is prevented, and with a low cost and simple structure, falling out or dislodgement of the tubes that are connected to the connecting plugs 34, 58 can reliably be prevented from occurring.

Still further, by providing the annular projections 46, 66 on ends of the first and second connecting members 30, 54, when the connecting plugs 34, 58 are screw-engaged with respect to the first and second connecting members 30, 54, the projections 46, 66 are press-fitted into and deformed against the press-fitting grooves 48, 68 of the connecting plugs 34, 58. Consequently, a seal can be formed reliably between the first and second connecting members 30, 54 and the connecting plugs 34, 58, and the connecting plugs 34, 58 can be fastened more firmly to the first and second connecting members 30, 54.

Further, the installation port 26 of the conduit 20 is provided on the housing 14, whereby a measurement sensor 28 such as a pressure sensor, a temperature sensor, or the like can be attached directly and selectively through the installation port 26. In general, in the event that the flow rate of a liquid is to be measured, the temperature of the liquid is measured and a temperature correction is applied to the measurement of the flow rate with the aim of enhancing precision. For example, compared to the case of providing a temperature sensor separately from the ultrasonic flow meter 10 for performing such a temperature measurement, the tubing arrangement can be simplified, and since the measurement sensor 28 (temperature sensor) can be arranged in the immediate vicinity of the liquid on which the flow rate measurement is carried out, the temperature measurement can be performed with greater accuracy, and the flow rate measurement can be carried out with higher accuracy by means of high-precision temperature correction.

Figure 5:
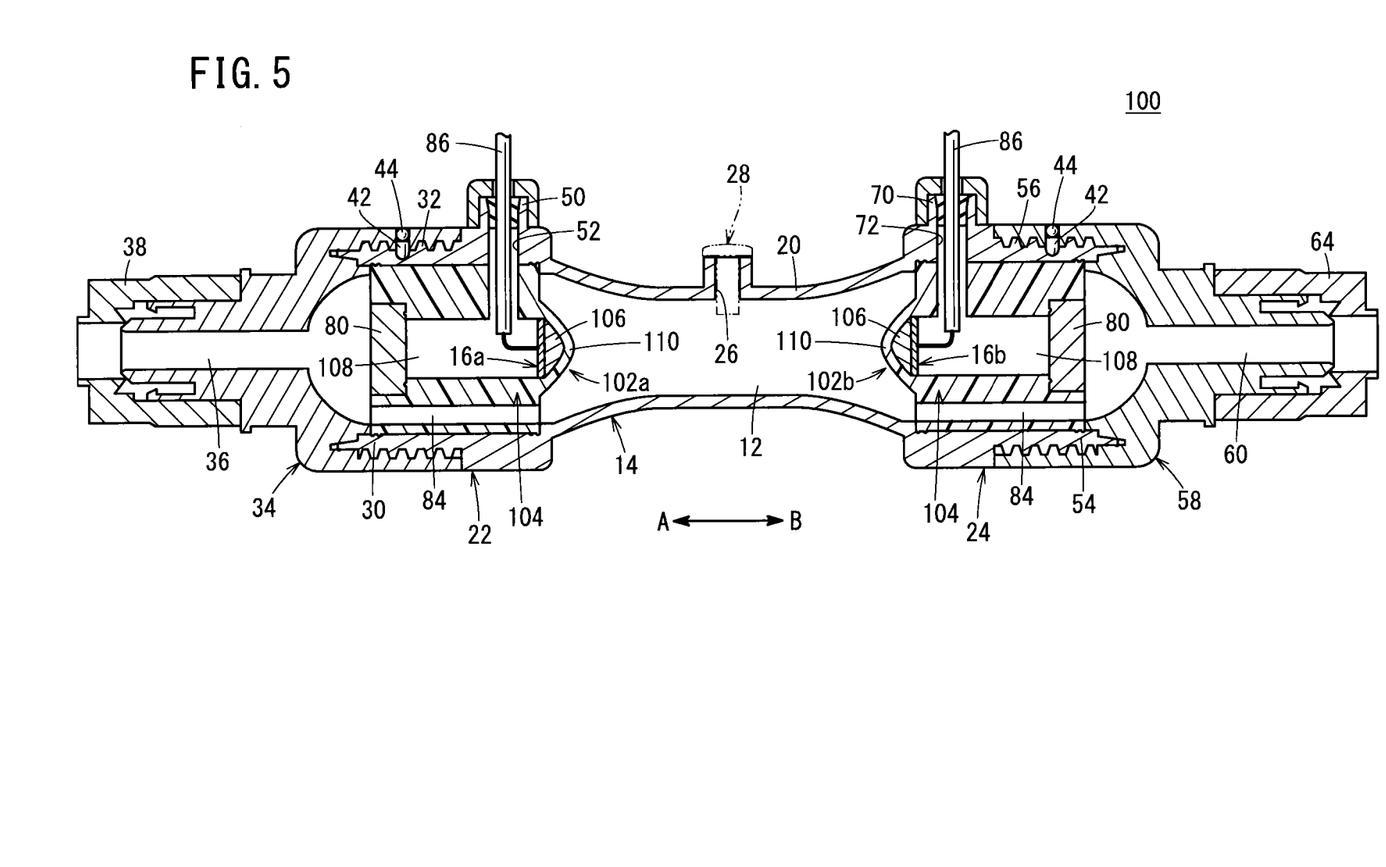
FIG. 5 is an overall cross sectional view of an ultrasonic flow meter according to a second embodiment of the present invention.
Figure 6:
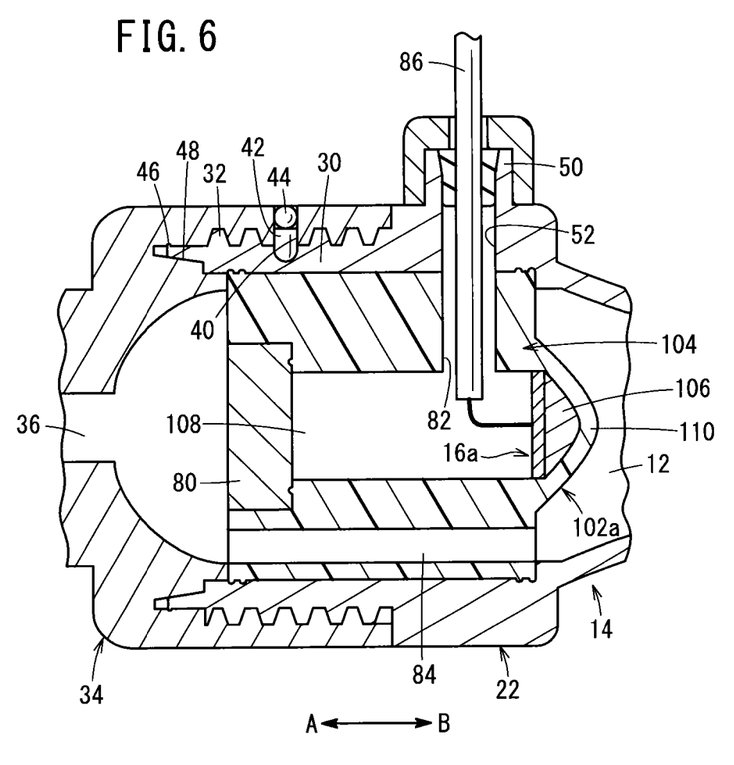
FIG. 6 is an enlarged cross sectional view showing the vicinity of one detection unit in the ultrasonic flow meter of FIG. 5.

Next, an ultrasonic flow meter 100 according to a second embodiment is shown in FIGS. 5 and 6. Structural elements thereof, which are the same as those of the ultrasonic flow meter 10 according to the above-described first embodiment, are denoted by the same reference characters, and detailed description of such features is omitted.

The ultrasonic flow meter 100 according to the second embodiment differs from the ultrasonic flow meter 10 according to the above-described first embodiment, in that, as shown in FIG. 5, vibration absorbing members (propagation members) 106 are provided respectively between the holders 104 and the acoustic wave transmitting and receiving units 16*a*, 16*b* that make up detection units 102*a*, 102*b*.

As shown in FIGS. 5 and 6, the detection units 102*a*, 102*b* comprise holders 104, which are accommodated respectively in the first and second accommodating sections 22, 24 of the housing 14, and are mounted in facing relation to the passage 12 of the housing 14, acoustic wave transmitting and receiving units 16*a*, 16*b*, which are disposed in the interior of the holders 104, and vibration absorbing members 106, which are housed between the holders 104 and the acoustic wave transmitting and receiving units 16*a*, 16*b*.

The holders 104 are formed, for example, from a resin material and are substantially U-shaped in cross section, and have receiving holes 108 that extend along the axial direction (the direction of arrows A and B) in center portions thereof. In addition, the holders 104 have conical portions (protrusions) 110, which project with triangular shapes in cross section on other ends thereof confronting the passage 12.

The vibration absorbing members 106 are formed such that distal ends thereof are conically-shaped, for example, from a resin material that is capable of absorbing vibrations, and the distal ends are accommodated in interiors of the conical portions 110 of the holders 104. More specifically, the tapered distal ends of the vibration absorbing members 106 are arranged on sides of the passage 12.

As the resin material that makes up the vibration absorbing members 106, for example, polyetherimide (PEI) may be used. Stated otherwise, the vibration absorbing members 106 are formed from a material in which a propagation velocity of the acoustic signals is fast compared to a propagation velocity thereof in the material of the holders 104 in which the vibration absorbing members 106 are accommodated.

Further, the other ends of the vibration absorbing members 106 are formed in a flat shape perpendicular to the axial direction (the direction of arrows A and B), with the acoustic wave transmitting and receiving units 16*a*, 16*b* being mounted thereon.

In addition, in a state in which liquid is flowing through the interior of the passage 12 of the housing 14 in the ultrasonic flow meter 100, acoustic wave signals are transmitted, for example, from the acoustic wave transmitting and receiving unit 16*a* of one of the detection units 102*a* connected at one end of the housing 14, and after having passed through the vibration absorbing member 106, the acoustic wave signals propagate in the liquid while being reflected by the inner wall surface of the passage 12, and then the acoustic wave signals are received by the acoustic wave transmitting and receiving unit 16*b* of the other detection unit 102*b*, which is connected at the other end of the housing 14.

In this case, the acoustic wave signals propagate along the flow direction of the liquid (the direction of the arrow B in FIG. 5), and the acoustic wave signals are propagated with the intensity of the acoustic wave signals having been increased by the vibration absorbing member 106.

Further, in a reverse manner, acoustic wave signals are transmitted from the acoustic wave transmitting and receiving unit 16*b* of the detection unit 102*b* connected to the other end of the housing 14, and after having passed through the vibration absorbing member 106, the acoustic wave signals are received by the acoustic wave transmitting and receiving unit 16a of the detection unit 102a connected to the one end of the housing 14. In this case, the acoustic wave signals propagate along a direction opposite to the flow direction of the liquid (the direction of the arrow A in FIG. 5).

In addition, reception signals based on the acoustic wave signals, which are received by the acoustic wave transmitting and receiving units 16a, 16b, are output to the non-illustrated controller through the cables 86. A propagation time difference ΔT is calculated from the detection signals by the controller, not shown, based on a propagation time T1 for the case in which the acoustic wave signals were propagated in the flow direction of the liquid (in the direction of the arrow B), and a propagation time T2 for the case in which the acoustic wave signals were propagated in the direction opposite to the flow direction of the liquid (in the direction of the arrow A). A velocity V, i.e., a flow rate, of the liquid is calculated from the propagation time difference ΔT.

In the foregoing manner, with the second embodiment, by providing the conical portions 110, which project with triangular shapes in cross section toward the passage 12 on the other ends of the holders 104 that make up the detection units 102a, 102b, the flow of the liquid through the passage 12 of the housing 14 can be straightened and made to be laminar by the conical portions 110, whereby pressure losses are reduced and generation of gas bubbles can be effectively suppressed. As a result, lowering in detection accuracy caused by the adherence of gas bubbles with respect to the holders 104 of the detection units 102a, 102b can be prevented more effectively.

Further, by providing the vibration absorbing members 106 in the interiors of the conical portions 110 on the holders 104, the intensity of the acoustic wave signals that are transmitted and received by the acoustic wave transmitting and receiving units 16a, 16b is increased, and measurement of the flow rate can be performed sufficiently even at times of low flow rate when the flow rate of the liquid is small.

The ultrasonic flow meter according to the present invention is not limited to the above embodiments. Various changes and modifications may be made to the embodiments without departing from the scope of the invention as set forth in the appended claims.

What is claimed is:

1. An ultrasonic flow meter for measuring a flow rate of a liquid based on acoustic wave signals, the ultrasonic flow meter comprising:
    a casing having therein a passage through which the liquid flows;
    a pair of detectors that each include an acoustic wave transceiver capable of transmitting and receiving acoustic wave signals, the pair of detectors being arranged in confronting relation to each other in an interior of the casing while sandwiching the passage therebetween; and
    a pair of port members connected respectively to opposite ends of the casing and through which the liquid is supplied and discharged,
    wherein the casing, the port members, and the detectors are disposed on a straight line, and in the interior of the casing, the liquid supplied from one of the port members flows through a communication path formed on an outer circumferential side of the detectors and into the passage, and then flows through the passage to another of the port members,
    wherein each of the detectors includes a holder having a substantially centrally disposed protrusion that protrudes toward the passage, and
    wherein in an interior of each holder, a propagation member is disposed between the acoustic wave transceiver and the centrally disposed protrusion,
    wherein the protrusion is formed with a substantially triangular shape in cross section that tapers gradually toward the passage.

2. The ultrasonic flow meter according to claim 1, wherein the port members and the casing are connected together mutually by screw-engagement of threaded portions formed respectively on the port members and the casing, the threaded portions being formed by trapezoidal screw threads.

3. The ultrasonic flow meter according to claim 1, wherein engagement pins, which are inserted in a direction perpendicular to an axis of the port members and the casing for mutual engagement therewith, are disposed at connected regions between the casing and the port members.

4. The ultrasonic flow meter according to claim 1, wherein projections, which project in a radial outward direction, are formed on outer circumferential surfaces of ends of either one of the casing and the port members, and grooves, in which the ends are press-fitted, are formed on the port members or the casing that lie opposite to the one of the casing and the port members having the projections.

5. The ultrasonic flow meter according to claim 1, wherein an installation port, which communicates with the passage and in which a sensor for detecting a state of the liquid is mounted, is formed in the casing.

6. The ultrasonic flow meter according to claim 1, wherein the propagation member is disposed in which a propagation velocity of the acoustic wave signals is faster compared to a propagation velocity thereof in the holder.

7. The ultrasonic flow meter according to claim 1, wherein the propagation member is formed with a substantially triangular shape in cross section that tapers gradually toward the passage.

8. The ultrasonic flow meter according to claim 1, wherein each propagation member includes a side having a substantially planar shape to which an acoustic wave transmitting and receiving unit is mounted thereto.

* * * * *